US009244663B1

(12) United States Patent
Gschwind et al.

(10) Patent No.: US 9,244,663 B1
(45) Date of Patent: Jan. 26, 2016

(54) MANAGING TABLE OF CONTENTS POINTER VALUE SAVES

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/579,208

(22) Filed: Dec. 22, 2014

(51) Int. Cl.
*G06F 9/45* (2006.01)
*G06F 9/44* (2006.01)

(52) U.S. Cl.
CPC ... *G06F 8/43* (2013.01); *G06F 8/70* (2013.01)

(58) Field of Classification Search
CPC .............. G06F 8/43; G06F 8/70; G06F 8/434
USPC ......................................................... 717/151
See application file for complete search history.

(56) References Cited

U.S. PATENT DOCUMENTS

| | | | |
|---|---|---|---|
| 5,797,014 A * | 8/1998 | Gheith ....................... | G06F 8/41 717/163 |
| 6,625,807 B1 | 9/2003 | Chen | |
| 6,966,055 B2 | 11/2005 | Haber et al. | |
| 2011/0167415 A1 | 7/2011 | Hayashida | |
| 2011/0289303 A1 | 11/2011 | Silvera et al. | |
| 2013/0031535 A1 * | 1/2013 | Ji ............................. | G06F 8/443 717/145 |
| 2013/0086369 A1 * | 4/2013 | Blainey ..................... | G06F 8/41 712/226 |
| 2013/0086570 A1 | 4/2013 | Blainey et al. | |

OTHER PUBLICATIONS

Gschwind, M. et al., "Managing Table of Contents Pointer Value Saves," U.S. Appl. No. 14/725,284, filed May 29, 2015.
Gschwind, M. et al., "Table of Contents Pointer Value Save and Restore Placeholder Positioning," U.S. Appl. No. 14/478,564, filed Sep. 5, 2014.
Gschwind et al., "Table of Contents Pointer Value Save and Restore Placeholder Positioning," U.S. Appl. No. 14/510,225, filed Oct. 9, 2014.
IBM, "List of IBM Patents or Patent Applications Treated as Related."
Gschwind, M. et al, "Usage of TOC Register as Application Register," U.S. Appl. No. 14/206463, filed Mar. 12, 2014.

(Continued)

*Primary Examiner* — Chameli Das
*Assistant Examiner* — Viva Miller
(74) *Attorney, Agent, or Firm* — Penny L. Lowry; Steven L. Bennett

(57) ABSTRACT

A compiler identifies a function call in computer code. A linker directive associates the function call with a single table of contents (TOC) pointer value save placeholder. This single placeholder is the only TOC pointer value save placeholder associated with the function call. When a TOC pointer value save instruction occupies the placeholder, it ensures that the TOC pointer value is saved before the function call. The linker directive is then modified to associate the function call with two or more TOC pointer value save placeholders. When a TOC pointer value save instruction occupies at least one of the placeholders, it ensures that the TOC pointer value is saved before the function call. Under some circumstances, two or more of the placeholders must be occupied by a TOC pointer value save instruction to ensure that the TOC pointer value is saved before the function call.

12 Claims, 6 Drawing Sheets

(56) References Cited

OTHER PUBLICATIONS

Gschwind, M. et al., "Table of Contents Pointer Value Save and Restore Placeholder Positioning," U.S. Appl. No. 14/510,225, filed Oct. 9, 2014.

Gschwind, M. et al., "Suppression of Table of Contents Save Actions," U.S. Appl. No. 14/478,589, filed Sep. 5, 2014.

Gschwind, M. et al., "Suppression of Table of Contents Save Actions," U.S. Appl. No. 14/511,831, filed Oct. 10, 2014.

* cited by examiner

MANAGING TABLE OF CONTENTS POINTER VALUE SAVES

BACKGROUND

The present disclosure relates generally to computer systems, and more specifically to managing the placement of table of contents (TOC) pointer value save instructions in computer code.

In computer software, an application binary interface (ABI) describes the low-level interface between an application program and the operating system or between the application program and another application. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The compiler generates object code without knowing the final address or displacement of the code/data. Specifically, the compiler generates object code that will access a TOC for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module, i.e., a grouping of object code and data, in a computer program may have a different TOC pointer value. In some instances, a module may correspond to multiple TOCs where groups of at least one function may share a TOC different from other groups. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Disclosed herein are embodiments of a method, computer program product, and computing system for managing table of contents (TOC) pointer value save instructions in computer code, where the computer code has multiple TOC pointer value save placeholders. A compiler identifies a function call in the computer code that is associated with a linker directive. The linker directive associates the function call with a single TOC pointer value save placeholder. This single TOC pointer value save placeholder is the only one associated with the function call. When occupying the placeholder, a TOC pointer value save instruction ensures that the TOC pointer value is saved before the function call.

The linker directive is then modified to associate the function call with two or more TOC pointer value save placeholders. When at least one of the two or more placeholders is occupied by a TOC pointer value save instruction, that instruction ensures that the TOC pointer value is saved before the function call. Under some circumstances, two or more of the placeholders must be occupied by a TOC pointer value save instruction to ensure that the TOC pointer value is saved before the function call.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
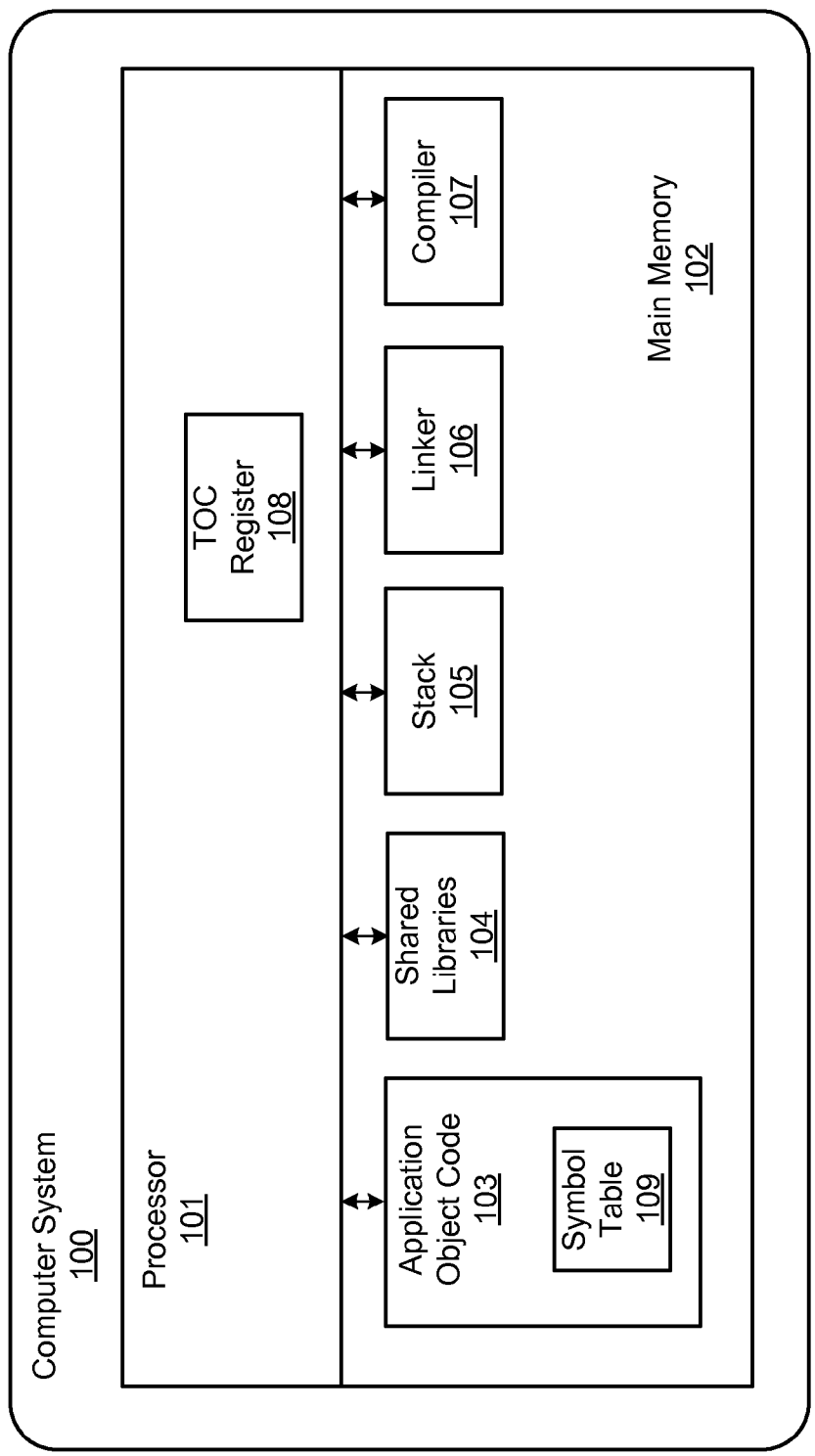
FIG. 1 illustrates an example computer system for managing table of contents (TOC) pointer value saves, according to various embodiments.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, and more particular aspects relate to managing the placement of table of contents (TOC) pointer value save instructions in executable computer code. While the present disclosure is not necessarily limited to such applications, various aspects of the disclosure may be appreciated through a discussion of various examples using this context.

A TOC pointer value that is stored in a TOC register for a calling function may require a save when the calling function calls another function. Some function calls may not require a TOC pointer value save. For example, for a function call from a calling function to a callee function that is in the same module as the calling function (i.e., a local function call), the TOC pointer value is the same for the calling and the callee function, and the TOC pointer value in the TOC register does not need to be saved and restored in conjunction with the local function call, but is rather left in the TOC register for use by the callee function. Where multiple different TOCs exist in a single module, each collection of functions with a separate TOC may be treated as a separate module, and only calls sharing a TOC are treated as local calls, whereas calls to functions in the same module but having a different TOC are treated as external calls.

A compiler may identify a location in the code for a TOC pointer value save when a calling function calls a callee function. When the compiler emits code, a TOC pointer value save placeholder instruction, such as a NOP instruction, may be inserted at the identified location. At each function call, the function call instructions along with a linker directive, such as a relocation indicator, may be inserted. The linker directive associates the function call with a particular placeholder. The compiler may insert these placeholder instructions for calling functions that may not need a TOC pointer value save because it is unknowable at compile time whether the callee function is a local or an external function and whether or not a save of a TOC pointer needs to occur. At linking, if the linker determines that a TOC pointer value save is needed at the function call, the linker replaces the placeholder instruction referenced by the linker directive with a TOC pointer value save instruction.

In some embodiments, TOC pointer value save placeholders may be TOC pointer value save instructions. In such embodiments, upon determining that a TOC pointer value save is not needed in conjunction with the function call, the linker may remove unnecessary TOC pointer value save instructions, replace them with NOP instructions, or otherwise deactivate the unnecessary TOC pointer value save instructions.

A compiler may use any of a variety of algorithms to determine the location of the TOC pointer value save placeholder for a given function call, and to create a correspondence between the placeholder and the function call. For example, the compiler may use control flow analysis with "lazy code motion" (LCM) to determine the positions of placeholders. LCM is an optimization technique that identifies an expression that is computed several times during the execution of a program, and moves the computation of such expression to different locations, in order to compute it less frequently overall. LCM takes into consideration places where the result of the expression (e.g. TOC save instruction) is needed ("uses"), e.g., function calls. LCM may also take into consideration where inputs needed to compute the expression are modified ("kills"), e.g., instructions that invalidate the TOC save instruction. Where there are kills, the expression needs to be recomputed if needed again afterwards. Other techniques may be used by the compiler for positioning the TOC pointer value save placeholders. For example, an optimization technique to remove code from a loop may be loop-invariant code motion. Combining multiple TOC pointer value save placeholder sites may be done by commoning techniques such as common sub-expression elimination.

Ideally, TOC pointer value saves are performed only when necessary. Unnecessary TOC pointer value saves increase execution time and waste computer resources. TOC pointer value save overhead may be reduced by introducing linker directives or other indicators of correspondence that can associate individual function calls with multiple TOC pointer value save placeholders, rather than restricting such associations to only a single placeholder. In some embodiments, a linker may perform a linear scan through the object to update TOC pointer value save placeholders and/or insert TOC pointer value save instructions. In other embodiments, a linker may perform a topological sort or other ordering or graph structure of TOC pointer value save placeholders, and may process the placeholders in accordance with a sort or graph ordering. In some embodiments, the linker may perform additional optimization of TOC pointer value saves by performing additional processing on a graph or list of TOC pointer value save locations in conjunction with information about whether function calls are local or external, for example by coloring a graph.

To illustrate the concept of associating individual function calls with multiple TOC pointer value save placeholders, a first TOC pointer value save placeholder may serve as a primary placeholder for a particular function call, and a second TOC pointer value save placeholder may serve as a secondary placeholder for the particular function call. If the linker determines that a TOC pointer value save is necessary before the function call, the linker may replace the primary placeholder, the secondary placeholder, or both placeholders with TOC pointer value save instructions. In some embodiments, a particular function call may be associated with more than two TOC pointer value save placeholders.

TABLE 1

Example code segment f( );
if (x) {
    g( );
}

For example, a TOC pointer value save placeholder positioning algorithm for the code segment in Table 1 may produce a first placeholder (NOP1) located before f( ) that serves as the TOC pointer value save placeholder for f( ) and a second placeholder (NOP2) located before g( ) that serves as the TOC pointer value save placeholder for g( ), as shown in Table 2. This approach may work well in some cases, but results in an unnecessary second TOC pointer value save instruction if both f( ) and g( ) are determined to be external calls during linking

TABLE 2

| Example code segment |
| --- |
| NOP1;           // TOC pointer value save placeholder<br>f( );<br>if (x) {<br>    NOP2;       // TOC pointer value save placeholder<br>    g( );<br>} |

Another TOC pointer value save placeholder positioning algorithm for the code segment in Table 1 may produce a single placeholder (NOP1) located before f( ) that serves as the TOC pointer value save placeholder for both f( ) and g( ), as shown in Table 3. This approach may also work well in some cases, but if f( ) is a local call and g( ) is an external call, and if the condition (x) is rarely true, then a TOC pointer value save instruction placed at NOP1 is largely unnecessary and wasteful of resources.

TABLE 3

| Example code segment |
| --- |
| NOP1;           // TOC pointer value save placeholder<br>f( );<br>if (x) {<br>    g( );<br>} |

Furthermore, when multiple paths through the code can be taken to reach a particular function call, a TOC pointer value save may be needed for only some of the paths. When a TOC pointer value save placeholder positioning algorithm selects a location that will cover all possible paths, then unnecessary TOC pointer value saves will be performed along those paths that do not require the TOC pointer value save. The detrimental effects of such unnecessary TOC pointer value saves may be increased when combined with looping constructs in the code. Associating individual function calls with multiple TOC pointer value save placeholders, rather than restricting such associations to only a single placeholder, may reduce or eliminate overhead resulting from unnecessary TOC pointer value saves. Each placeholder can be associated with a single function call or with multiple function calls, resulting in an n:m relationship.

In some embodiments, conditional expressions may govern the association between an individual function call and multiple TOC pointer value save placeholders. For example, a primary TOC pointer value save placeholder may satisfy the requirement of saving the TOC pointer value for the function call, but a secondary placeholder may be a more efficient location in some circumstances. If the primary placeholder is activated to perform a TOC pointer value save for some other reason unrelated to the specific function call (e.g., including but not limited to the presence of another external function call, as in the example of table 2), then that TOC pointer value save can also be used to satisfy a TOC pointer value save requirement for the function call, and no additional TOC pointer value save is necessary. But if the function call would be the only reason to activate the primary placeholder, then a more efficient approach would be to activate only the secondary placeholder, leaving the primary placeholder inactive. An example output illustrating this scenario based on the code segment in Table 1 is produced in Table 4 below. In this example, the notation @ in conjunction with a placeholder location (indicated by a symbolic name used in the examples herein) is used to indicate an associated placeholder to be used for storing a TOC register. Further, the notation @(if not NOP1, then NOP2) is used to indicate if a first location NOP1 has not already been selected to store a TOC register (e.g., due to another external function call), then a second location should be used to save the TOC register if the associated function call is an external call.

TABLE 4

| Example code segment |
| --- |
| NOP1;           // TOC pointer value save placeholder<br>f( ); @ NOP 1<br>if (x) {<br>    NOP2;       // TOC pointer value save placeholder<br>    g( ); @(if not NOP1, then NOP2)<br>} |

For function call f( ), a linker directive is inserted to indicate that placeholder NOP1 is the unconditional location for a TOC pointer value save instruction when the call to f( ) is an external call. For function call g( ), a linker directive is inserted to indicate two possible locations for a TOC pointer value save instruction when the call to g( ) is an external call. If f( ) is an external call, then the TOC pointer value save at NOP1 is sufficient for the call to g( ). But if f( ) is a local call, then NOP2 is a more efficient place for the TOC pointer value save before the call to g( ).

In another example, a single TOC pointer value save placeholder may satisfy the requirement of saving the TOC pointer value for the function call, but a combination of two or more placeholders in other locations may be more efficient in some circumstances. An example output based on a modified version of the code segment in Table 1 is produced in Table 5 below. In the example below, the notation @(NOP1, NOP2) is used to indicate that a TOC store should be inserted in the placeholder locations indicated by NOP1 and NOP2. In yet other more general examples, @(list) may contain a list of one or more placeholder locations to concurrently insert.

TABLE 5

| Example code segment |
| --- |
| NOP1 ;           // TOC pointer value save placeholder<br>f( ); @ NOP1<br>if (need more memory) {<br>    more_mem[i++] = alloca(MEM_CHUNK); // kill<br>    NOP2;       // TOC pointer value save placeholder<br>}<br>NOP3;           // TOC pointer value save placeholder<br>g( ); @(NOP1, NOP2) |

For function call f( ), a linker directive is inserted to indicate that placeholder NOP1 is the unconditional location for a TOC pointer value save instruction when the call to f( ) is an external call. But since the conditional dynamic memory allocation (alloca) kills a TOC pointer value save at NOP1, that location cannot be counted on as a reliable location to save the TOC pointer value when the call to g( ) is an external call. Rather than associating g( ) with NOP3, which would result in unnecessary TOC pointer value saves whenever need_more_memory is false, a linker directive is inserted to indicate a combination of two locations, NOP1 and NOP2, for unconditional TOC pointer value save instructions when the call to g( ) is an external call.

A more complex example output based on a modified version of the code segment in Table 1 is produced in Table 6 below. The example below includes two @(if not NOPx, then NOPy) statements to be evaluated in the order presented in the example in order to create a decision hierarchy.

TABLE 6

Example code segment

| NOP1; | // TOC pointer value save placeholder |
| f( ); @ NOP1 | |
| if (need more memory) { | |
|     more_mem[i++] = alloca(MEM_CHUNK); | |
|     NOP2; | // TOC pointer value save placeholder |
| } | |
| NOP3; | // TOC pointer value save placeholder |
| g( ); @(if not NOP1, then NOP3) | |
|     @(if not NOP3, then NOP2) | |

When the call to f( ) is external and the call to g( ) is local, then NOP1 is the only location where the TOC pointer value is saved. When the call to f( ) is external and the call to g( ) is local, then the TOC pointer value is saved at both NOP1 and NOP2. But when the call to f( ) is local and the call to g( ) is external, then the TOC pointer value is saved only at NOP3.

FIG. 1 illustrates an example computer system 100 configured to manage table of contents (TOC) pointer value saves. Computer system 100 may include a processor 101 and a main memory 102. Application object code 103, which is generated from program source code (not shown) by a compiler such as compiler 107, may include a plurality of functions, and may be stored in main memory 102 for execution by processor 101. The application object code 103 may be generated by a compiler that is located on a different computer system from computer system 100. Application object code 103 may include a symbol table 109, which may be generated by the compiler 107 when the application object code 103 is generated. The symbol table 109 may include a data structure that associates each identifier (i.e., function and variable names) in a program's source code with information relating to its declaration or appearance in the source code, such as type, scope level, and/or location.

In various embodiments, the computer system 100 may include other components. Shared libraries 104 may include functions that are external to application object code 103 and may be called during execution of application object code 103 via external function calls. Stack 105 may include a data structure that stores information, including a TOC pointer, related to active functions during the execution of application object code 103. Each active function in application object code 103 has a respective stack frame in stack 105 during execution. Static linker 106 may include a component that inserts TOC pointer value save instructions at TOC pointer value save placeholder locations in application object code 103 for calls to external/global functions. TOC register 108 may be a hardware register located in processor 101. TOC register 108 may store a value of a TOC pointer for the currently active function of application object code 103 (i.e., the function that is currently executing) when a TOC pointer is used by a function. The TOC register 108 may be register R2, for instance in Power® ABI. Although, in other computer architectures, other registers may be used or numbered differently.

In further embodiments of a computer system such as computer system 100, the TOC register 108 may store a global offset table (GOT) pointer value instead of a TOC pointer value, and GOT save and restore points may be managed in application object code 103 by static linker 106 when a GOT is used by the function. When referring to TOC herein, GOT may be considered as a substitute for TOC and TOC may be used to indicate both TOC and GOT or any other table used to store pointers or addresses code uses to locate data. In yet other embodiments, the TOC register 108 may store a pointer providing access to another data dictionary structure, i.e., a structure designed to provide access to data not stored on a stack frame.

Figure 2:
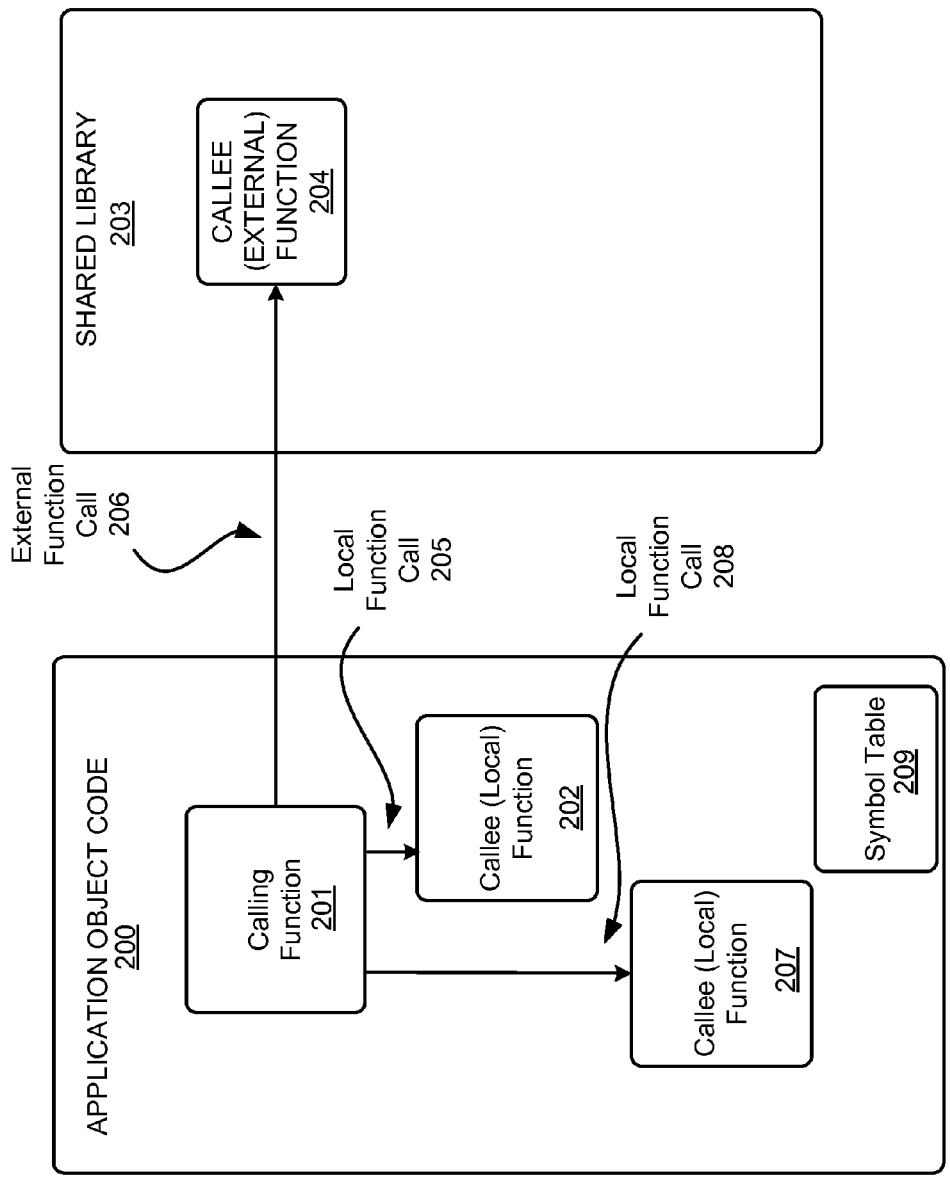
FIG. 2 illustrates example local and external function calls in computer code, according to various embodiments.

FIG. 2 illustrates embodiments of local function calls 205 and 208, and an external function call 206. FIG. 2 is discussed with reference to FIG. 1. Application object code 200 may include application object code 103 of FIG. 1, and shared library 203 may include shared libraries 104 of FIG. 1. Calling function 201, callee function 202, and callee function 207 are part of application object code 200, and callee function 204 is part of shared library 203. If the calling function 201 and the callee functions 202, 207 are all part of application object code 200, then the callee functions 202, 207 are local to the calling function 201. The calls are local function calls 205, 208 and the calling function 201 and the callee functions 202, 207 have the same TOC pointer value, so the TOC pointer value does not need to be saved and restored in conjunction with the local function calls 205, 207.

If the calling function 201 is part of the application object code 200, and the callee function 204 is in the shared library 203, then the callee function 204 is external to the calling function 201 and the call is an external function call 206, and the calling function 201 and the callee function 204 have different TOC pointer values. Thus, the linker inserts TOC save and restore instructions in conjunction with any external function call. In various embodiments, the linker may insert TOC save and restore instructions with a possible external function call based on the information available at static link time, even if the call is determined not to be an external call during the load time. When calling function 201 performs an external function call 206 to callee function 204 then the value of the TOC pointer of the calling function 201 is saved from TOC register 108 to the stack frame 105.

When the callee function 204 exits and execution passes back to the calling function 201, the value of the TOC pointer of the calling function 201 is restored to the TOC register 108 from the stack frame for the calling function 201 in the stack 105. FIG. 2 is shown for illustrative purposes only; any number of functions may be included in application object code 200 and shared library 203, and these functions may call one another in any appropriate manner. In various embodiments an external function, such as callee function 204, may not require a TOC pointer value or requires a different TOC pointer value than the calling function 201. For either instance, the TOC pointer value of the calling function needs to be saved regardless of use, because the caller does not know how and if the TOC register is used or whether it may be preserved when it is not used as a TOC register in regards to external function calls.

Figure 3:
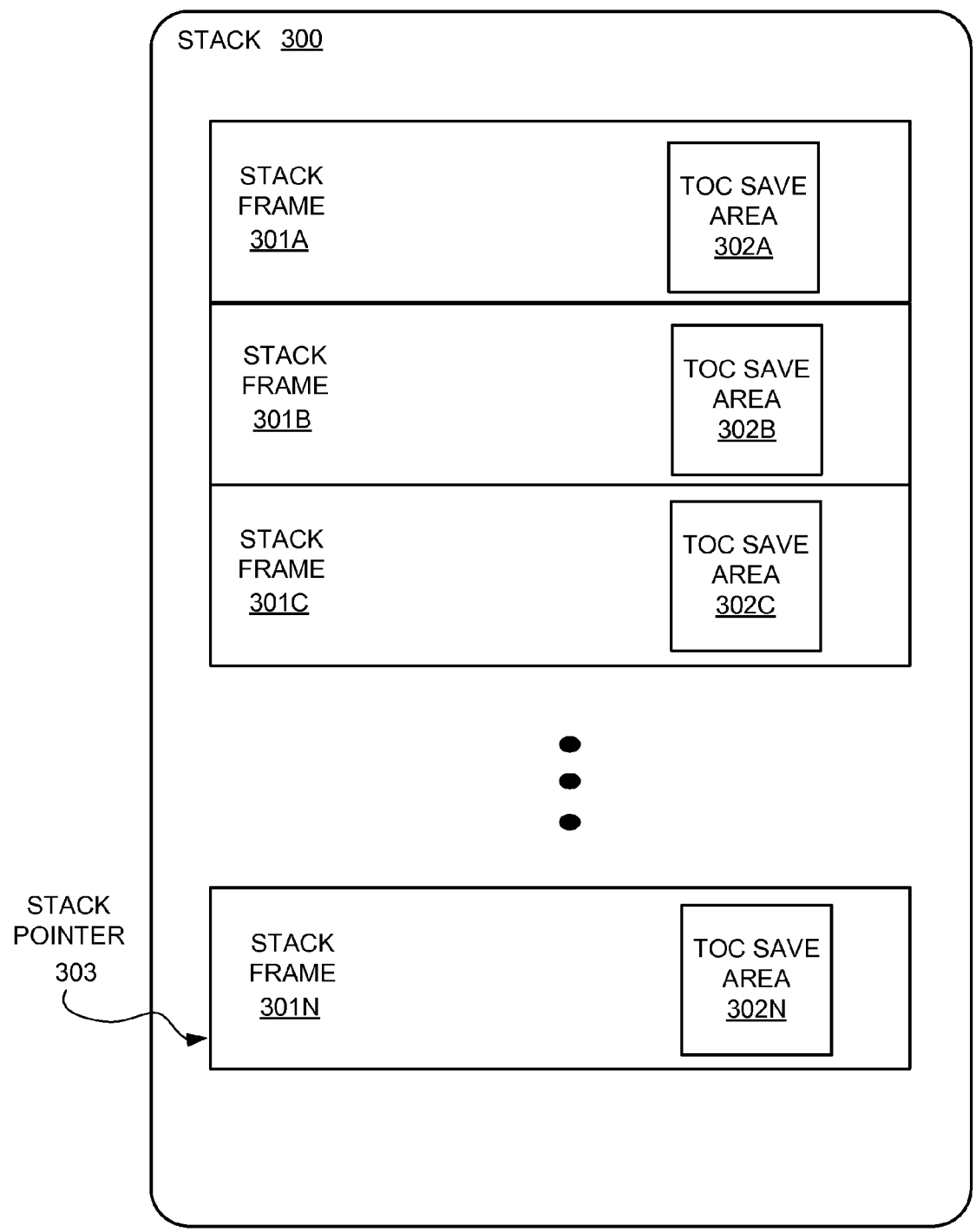
FIG. 3 illustrates an example stack for storage of a TOC pointer value, according to various embodiments.

FIG. 3 illustrates an embodiment of a runtime stack 300. Stack 300 may include stack 105 of FIG. 1. FIG. 3 is discussed with reference to FIGS. 1 and 2. Stack 300 includes a plurality of stack frames 301A-N corresponding to active functions that are currently being executed during execution of application object code 103 by processor 101. The stack 300 grows downwards from stack frame 301A, and a stack pointer 303 points to the most recently added stack frame 301N on the stack 300. Each stack frame of stack frames 301A-N stores information regarding its respective function, and includes a respective TOC save area 302A-N. When a calling function 201 calls an external callee function 204, then the TOC pointer value of the calling function 201 is saved from the TOC register 108 to the TOC save area of the calling function's stack frame (for example, TOC save area 302N in stack frame 301N) in stack 300. The TOC pointer value is saved for restoration to the TOC register 108 after the callee function 204 completes and execution passes back to the calling function 201. The callee function may load its own TOC pointer value within the TOC register 108.

Figure 4:
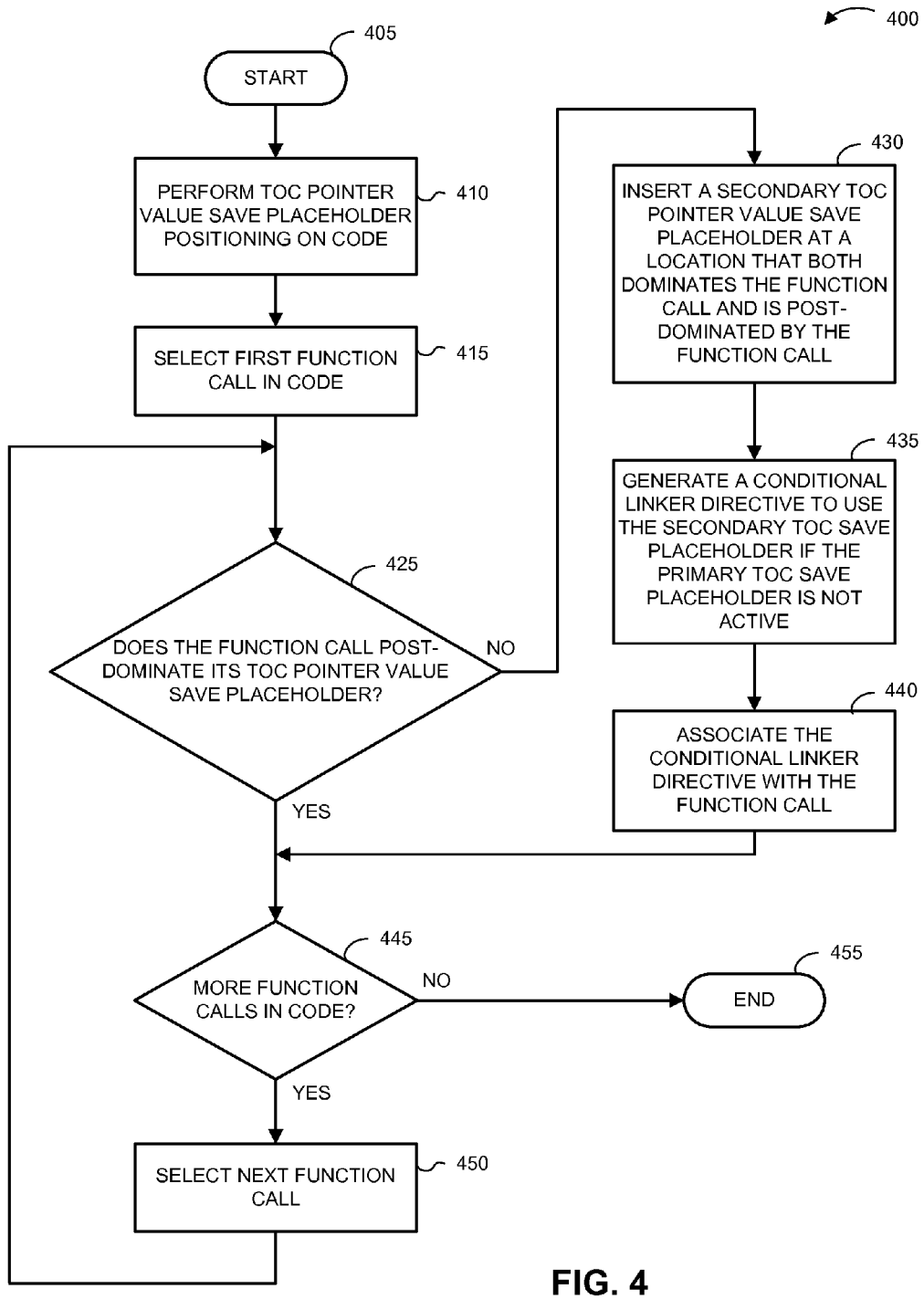
FIG. 4 illustrates an example method for associating function calls with multiple TOC pointer value save placeholders, according to various embodiments.

FIG. 4 illustrates an example method 400 for generating linker directives or other indicators of correspondence associating function calls with multiple TOC pointer value save placeholders. From start 405, a TOC pointer value save placeholder positioning algorithm is performed at 410 to associate a dominating placeholder with each function call during compiling of the code. In some embodiments, this involves determining global TOC pointer value save locations, and performing post processing to associate the TOC pointer value save locations with the placeholders. Although the resulting placeholders may be adequate to ensure that the TOC pointer value is saved when necessary, restricting each function call to correspond to only one placeholder may result in unnecessary TOC pointer value saves under some conditions.

A function call is selected at 415. If the function call post-dominates its associated TOC pointer value save placeholder at 425, then no further optimizing is performed for the function call and the next function call is selected at 450. A function call post-dominates its associated TOC pointer value save placeholder if all possible code paths starting at the placeholder will reach the function call, with no intervening kills. Kills are instructions that invalidate a TOC save instruction.

If the function call does not post-dominate its associated TOC pointer value save placeholder (the primary placeholder) at 425, then a new TOC pointer value save placeholder (the secondary placeholder) is inserted at a location that both dominates the function call and is post-dominated by the function call at 430. In some embodiments, this may be achieved by inserting the secondary placeholder in the basic block containing the function call. Additional optimizations may be performed so long as the secondary placeholder offers benefits over the primary placeholder. At 435, a linker directive or other indicator of correspondence is generated, indicating that if the primary placeholder will be used to save the TOC pointer value anyway, then the secondary placeholder is not needed. But if the primary placeholder is not activated for some other reason, then the secondary placeholder is a more optimal location to save the TOC pointer value before the function call.

The linker directive is associated with the function call at 440 and the next function call is selected at 450. When all function calls have been processed at 445, the method ends at 455. For simplicity of illustration, method 400 shows only a two-level hierarchy of possible placeholders, but multiple-level hierarchies are contemplated. In some embodiments, a file is output containing the multiple placeholders in the hierarchy and the conditions for placement.

Figure 5:
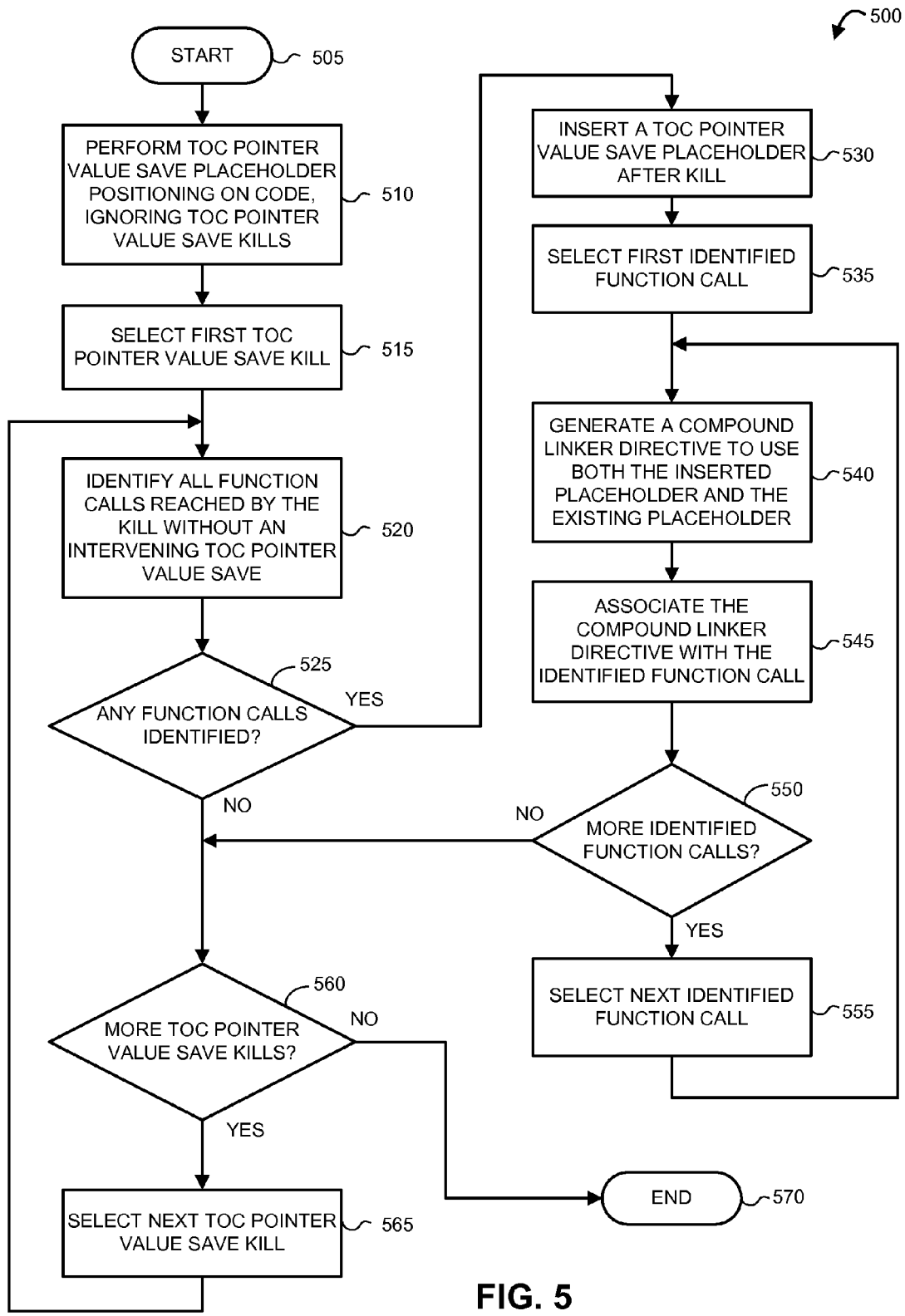
FIG. 5 illustrates an example method for associating function calls with multiple TOC pointer value save placeholders, according to various embodiments.

FIG. 5 illustrates an example method 500 for generating linker directives or other indicators of correspondence associating function calls with multiple TOC pointer value save placeholders. From start 505, a TOC pointer value save placeholder positioning algorithm is performed at 510 to associate a dominating placeholder with each function call during compiling of the code, but the algorithm ignores kills when determining where to locate the placeholders.

A kill in the code is selected at 515. At 520, all function calls reached by the kill without an intervening TOC pointer value save are identified. If no function calls were identified at 525, then the next kill is selected at 565. If at least one function call was identified at 525, then a new TOC pointer value save placeholder is inserted after the kill at 530. In some embodiments, the new placeholder is inserted immediately after the kill. In some embodiments, additional optimizations are performed to determine the best location after the kill for the new placeholder.

The first identified function call is then selected at 535. At 540, a linker directive or other indicator of correspondence is generated, indicating that both the existing dominating placeholder and the newly inserted placeholder must be used in combination to save the TOC pointer value before the function call. The linker directive is associated with the function call at 545 and the next identified function call is selected at 555. When all identified function calls have been processed at 550, then the next kill is selected at 565. When all kills have been processed at 560, then the method ends at 570.

In some embodiments, additional efficiencies can be realized by taking into account all the individual newly inserted placeholders resulting from method 500, and creating hierarchical placements when multiple placeholders are inserted between a function call's dominating and newly inserted placeholders. In some embodiments, a file is output containing the multiple placeholders and indications.

Figure 6:
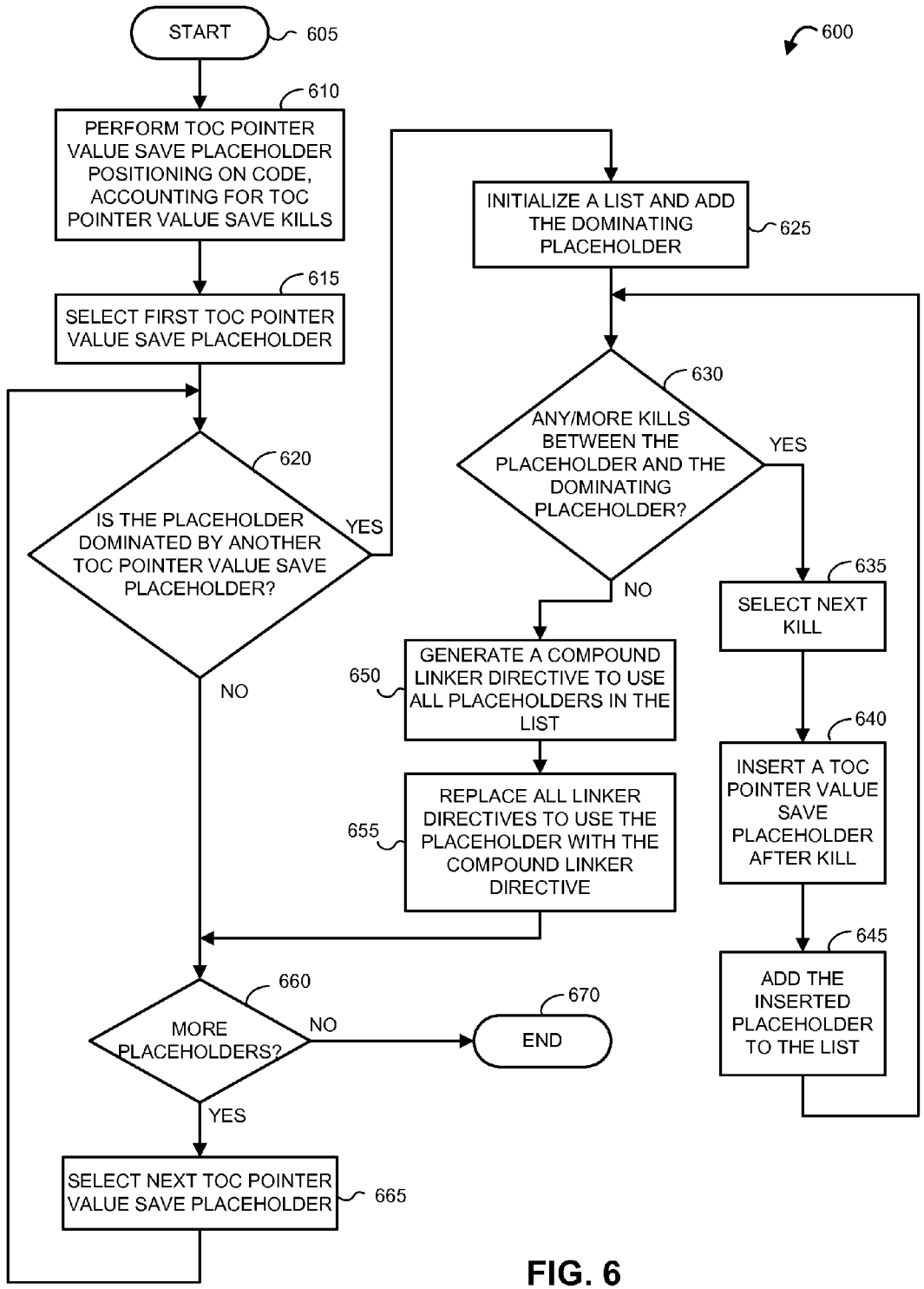
FIG. 6 illustrates an example method for associating function calls with multiple TOC pointer value save placeholders, according to various embodiments.

FIG. 6 illustrates an example method 600 for generating linker directives or other indicators of correspondence associating function calls with multiple TOC pointer value save placeholders. From start 605, a TOC pointer value save placeholder positioning algorithm is performed at 610 to associate a dominating placeholder with each function call during compiling of the code, accounting for kills when determining where to locate the placeholders.

A TOC pointer value save placeholder in the code is selected at 615. If the placeholder is not dominated by another placeholder at 620, then the next placeholder is selected at 665. If the placeholder is dominated by another placeholder at 620, then a list of placeholders is initialized to a one-element list containing the dominating placeholder at 625. If there are kills between the placeholder and the dominating placeholder at 630, a kill is selected at 635. A new TOC pointer value save placeholder is inserted after the kill at 640, and the new placeholder is added to the list of placeholders at 645.

When all kills between the placeholder and the dominating placeholder are processed at 630, a linker directive or other indicator of correspondence is generated at 650, indicating that all placeholders in the list must be used in combination to save the TOC pointer value before a function call. This directive then replaces the existing directive for all function calls associated with the placeholder at 655. The next TOC pointer value save placeholder is then selected at 665. When all placeholders have been processed at 660, then the method ends at 670.

When a linker processes object code having function calls that correspond to multiple TOC pointer value save placeholders, it may first determine whether each function call is local or external. For each external call, the linker may then populate the placeholders with TOC pointer value save instructions according to the directives associated with the function calls. If a directive indicates, for example, that three separate placeholders must contain a save for a function call, then the linker ensures that a TOC pointer value save instruction is present at each of the three placeholders. If a directive indicates, for example, that only one of three separate placeholders in a hierarchy must contain a save for a function call, then the linker selects the appropriate placeholder and ensures that a TOC pointer value save instruction is present at that placeholder. After all necessary TOC pointer value save instructions are placed, the linker may ensure that any unnecessary TOC pointer value save instructions are removed or otherwise inactivated.

In some embodiments, a linker may perform additional TOC pointer value save optimizations in addition to the optimizations performed by a compiler.

TABLE 7

Example code segment

```
NOP1;              // TOC pointer value save placeholder
f( ); @ NOP1
if (x) {
        NOP2;      // TOC pointer value save placeholder
        g( ); @(if not NOP1, then NOP2)
}
else {
        NOP3;      // TOC pointer value save placeholder
        h( ); @(if not NOP1, then NOP3)
}
```

If the function call f( ) in Table 7 is an external call, then the linker will replace NOP1 with a TOC pointer value save instruction, and this save instruction will suffice for g( ) and h( ) as well if they are also external calls. If f( ) and h( ) are local and g( ) is external, then only NOP2 is replaced. If f( ) and g( ) are local and h( ) is external, then only NOP3 is replaced. But if f( ) is local and both g( ) and h( ) are external, then rather than replacing both NOP2 and NOP3, the linker may select NOP1 only. Since NOP1 dominates both NOP2 and NOP3, selecting NOP1 satisfies the linker directives for both g( ) and h( ).

Note that although in this example every code path that goes through NOP1 will also go through either NOP2 or NOP3, making selection of NOP1 rather than both NOP2 and NOP3 more efficient, in some examples an alternate selection of NOP1 rather than both NOP2 and NOP3 may be less efficient. To address this, some embodiments may provide that a compiler provide enriched linker directives, for example adding flags to indicate code flow relationships among various placeholders.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to enable others of ordinary skill in the art to understand the invention for various embodiments with various modifications as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for managing table of contents (TOC) pointer value save instructions in computer code, the computer code having a plurality of TOC pointer value save placeholders, the computer program product comprising a computer readable storage medium having program instructions embodied therewith, the program instructions executable by a processor to perform a method comprising:
   identifying, with a compiler, a first function call in the computer code, the first function call associated with a linker directive, the linker directive associating the first function call with a single TOC pointer value save placeholder, the single TOC pointer value save placeholder being the only TOC pointer value save placeholder associated with the first function call, a single TOC pointer value save instruction, when occupying the single TOC pointer value save placeholder, ensuring that a TOC pointer value is saved before the first function call; and
   modifying the linker directive to associate the first function call with a first TOC pointer value save placeholder and to further associate the first function call with a second TOC pointer value save placeholder, at least one TOC pointer value save instruction, when occupying at least one of the first TOC pointer value save placeholder and the second TOC pointer value save placeholder, ensuring that the TOC pointer value is saved before the first function call.

2. The computer program product of claim 1, wherein the modified linker directive instructs a linker to ensure that a first TOC pointer value save instruction occupies the first TOC pointer value save placeholder and that a second TOC pointer value save instruction occupies the second TOC pointer value save placeholder.

3. The computer program product of claim 1, wherein the modified linker directive instructs a linker to ensure that a second TOC pointer value save instruction occupies the second TOC pointer value save placeholder only when a first TOC pointer value save instruction does not occupy the first TOC pointer value save placeholder.

4. The computer program product of claim 1, wherein a single no operation (NOP) instruction occupies the single TOC pointer value save placeholder, and wherein the method further comprises:
   inserting, with the compiler, a first NOP instruction at the first TOC pointer value save placeholder;
   inserting, with the compiler, a second NOP instruction at the second TOC pointer value save placeholder; and
   replacing, with a linker, at least one of the first NOP instruction and the second NOP instruction with a TOC pointer value save instruction.

5. The computer program product of claim 1, wherein a single TOC pointer value save instruction occupies the single TOC pointer value save placeholder, and wherein the method further comprises:
   inserting, with the compiler, a first TOC pointer value save instruction at the first TOC pointer value save placeholder;

inserting, with the compiler, a second TOC pointer value save instruction at the second TOC pointer value save placeholder; and replacing, with a linker, at least one of the first TOC pointer value save instruction and the second TOC pointer value save instruction with a NOP instruction.

6. A computing system for managing table of contents (TOC) pointer value save instructions in computer code, the computer code having a plurality of TOC pointer value save placeholders, the computing system comprising:

a memory; and a processor in communication with the memory, wherein the computing system is configured to perform a method, the method comprising:

identifying, with a compiler, a first function call in the computer code, the first function call associated with a linker directive, the linker directive associating the first function call with a single TOC pointer value save placeholder, the single TOC pointer value save placeholder being the only TOC pointer value save placeholder associated with the first function call, a single TOC pointer value save instruction, when occupying the single TOC pointer value save placeholder, ensuring that a TOC pointer value is saved before the first function call; and modifying the linker directive to associate the first function call with a first TOC pointer value save placeholder and to further associate the first function call with a second TOC pointer value save placeholder, at least one TOC pointer value save instruction, when occupying at least one of the first TOC pointer value save placeholder and the second TOC pointer value save placeholder, ensuring that the TOC pointer value is saved before the first function call.

7. The computing system of claim 6, wherein the modified linker directive instructs a linker to ensure that a first TOC pointer value save instruction occupies the first TOC pointer value save placeholder and that a second TOC pointer value save instruction occupies the second TOC pointer value save placeholder.

8. The computing system of claim 7, wherein the plurality of TOC pointer value save placeholders were generated by a positioning algorithm that ignores kill instructions, the kill instructions invalidating TOC pointer value save instructions, wherein the first TOC pointer value save placeholder is the single TOC pointer value save placeholder, and wherein the method further comprises:

identifying a kill instruction that invalidates the single TOC pointer value save instruction;

determining that the first function call is reached by the kill instruction with no intervening TOC pointer value save; and inserting the second TOC pointer value save placeholder after the kill instruction.

9. The computing system of claim 7, wherein the plurality of TOC pointer value save placeholders were generated by a positioning algorithm that accounts for kill instructions, the kill instructions invalidating TOC pointer value save instructions, and wherein the method further comprises:

determining that the single TOC pointer value save placeholder is dominated by the first TOC pointer value save placeholder;

identifying a kill instruction that invalidates a first TOC pointer value save instruction occupying the first TOC pointer value save placeholder; and inserting the second TOC pointer value save placeholder after the kill instruction.

10. The computing system of claim 6, wherein the modified linker directive instructs a linker to ensure that a second TOC pointer value save instruction occupies the second TOC pointer value save placeholder only when a first TOC pointer value save instruction does not occupy the first TOC pointer value save placeholder.

11. The computing system of claim 10, wherein the method further comprises:

determining that the first function call does not post-dominate the single TOC pointer value save placeholder; and inserting the second TOC pointer value save placeholder at a location that both dominates the first function call and is post-dominated by the first function call.

12. The computing system of claim 6, wherein a single NOP instruction occupies the single TOC pointer value save placeholder, and wherein the method further comprises:

inserting, with the compiler, a first NOP instruction at the first TOC pointer value save placeholder;

inserting, with the compiler, a second NOP instruction at the second TOC pointer value save placeholder; and replacing, with a linker, at least one of the first NOP instruction and the second NOP instruction with a TOC pointer value save instruction.

* * * * *